US 8,113,814 B2

(12) United States Patent
Padmanabhan et al.

(10) Patent No.: US 8,113,814 B2
(45) Date of Patent: Feb. 14, 2012

(54) BARREL CLAMPING SYSTEM FOR QUICK ASSEMBLING AND DISMANTLING OF EXTRUDER BARREL SECTIONS

(75) Inventors: Babu Padmanabhan, Bangalore (IN); Arunajatai Viswanathan, Bangalore (IN)

(73) Assignee: Steer Engineering Private Limited, Bangalore (IN)

( * ) Notice: Subject to any disclaimer, the term of this patent is extended or adjusted under 35 U.S.C. 154(b) by 0 days.

(21) Appl. No.: 12/884,831

(22) Filed: Sep. 17, 2010

(65) Prior Publication Data
US 2011/0070324 A1 Mar. 24, 2011

(30) Foreign Application Priority Data
Sep. 18, 2009 (IN) .......................... 2273/CHE/2009

(51) Int. Cl.
*B29C 47/66* (2006.01)
(52) U.S. Cl. ........................ 425/188; 366/79; 425/192 R
(58) Field of Classification Search .................. 425/188, 425/190, 192 R; 366/79
See application file for complete search history.

(56) References Cited

U.S. PATENT DOCUMENTS

| 4,640,672 A * | 2/1987 | Ellwood .................... 425/192 R |
| 7,473,087 B2 * | 1/2009 | Steiner .......................... 425/188 |
| 7,585,101 B2 * | 9/2009 | Watanabe et al. ......... 425/192 R |

FOREIGN PATENT DOCUMENTS

| JP | 3-178419 | * | 8/1991 |
| JP | 4-129723 | * | 4/1992 |
| JP | 6-297540 | * | 10/1994 |
| JP | 6-297541 | * | 10/1994 |
| JP | 7-266405 | * | 10/1995 |
| JP | 11-179786 | * | 7/1999 |

* cited by examiner

*Primary Examiner* — James Mackey
(74) *Attorney, Agent, or Firm* — Miller, Matthias & Hull LLP

(57) ABSTRACT

A system for clamping together a pair of extruder barrel sections of an extruder is disclosed. The system comprises of a clamp that includes an upper arm, and a lower arm connected to the upper arm at one edge of the upper arm. The upper and lower arms cooperating to define a recess configured to receive a pair of extruder barrel sections. The clamp further includes a locking structure configured to lock the upper arm to the lower arm with the pair of extruder barrel sections therebetween. The system further comprises of a support structure for the clamp that includes a bracket connected to the clamp and a column connected to a base of the extruder. The bracket and column are connected to each other such that relative movement between the bracket and the column is permitted axially along the extruder barrels sections. An extruder is also disclosed.

12 Claims, 13 Drawing Sheets

BARREL CLAMPING SYSTEM FOR QUICK ASSEMBLING AND DISMANTLING OF EXTRUDER BARREL SECTIONS

TECHNICAL FIELD

This disclosure relates generally to screw extruders. More particularly, it relates to a system for clamping the barrel sections of a screw extruder.

BACKGROUND

The disclosure relates to screw extruders comprising multiple barrel sections that are joined end-to-end and two screw shafts housed in the longitudinal through bore of the barrel sections. A single continuous cylindrical barrel, formed by joining multiple cylindrical barrel sections, forms the extruder-processing zone.

To produce the desired product, different processes need to be carried out in a specific sequence. This requires arranging the barrel sections in a specific order linearly, as dictated by the product and its properties. Therefore, the barrel sections have to be dismantled and re-assembled in a new order as and when required. Further, the various barrel sections need to be periodically dismantled for cleaning and maintenance purposes.

Conventionally, the barrel sections are joined end to end with their flanges abutted and then bolted together at the flanges. However, due to the presence of numerous bolts, which are required to tightly hold the barrel sections, the act of assembling and dismantling becomes cumbersome and time consuming Hence, there is need for a clamping mechanism that eases and/or expedites the act of assembling and dismantling the barrel sections and at the same time provides adequate clamping force.

Extruders operate at elevated temperatures and sometimes when thermal expansion of the barrel sections along the length of the twin-screw extruder takes place, the support conditions of the twin-screw extruder may be required to be changed for adequate support. If adequate change in support is not provided, it might lead to misalignment of the barrel sections. Moreover, relative thermal expansion between barrels may result in accumulation of stresses and misalignment of barrels. Therefore, there is need for a system that takes care of adjusting support conditions with variation in temperature of the twin-screw extruder. The support structure should also ease barrel mounting.

SUMMARY OF THE DISCLOSURE

A system for clamping together a pair of extruder barrel sections of an extruder is disclosed. The system comprises of a clamp that includes an upper arm, and a lower arm connected to the upper arm at one edge of the upper arm. The upper and lower arms cooperating to define a recess configured to receive a pair of extruder barrel sections. The clamp further includes a locking structure configured to lock the upper arm to the lower arm with the pair of extruder barrel sections therebetween. The system further comprises of a support structure for the clamp that includes a bracket connected to the clamp and a column connected to a base of the extruder. The bracket and column are connected to each other such that relative movement between the bracket and the column is permitted axially along the extruder barrels sections.

An extruder is also disclosed. The extruder comprises of a plurality of barrel sections abutting each other to form the extruder barrel and a clamping system for clamping together a pair of adjacent extruder barrel sections. The clamping system comprises of a clamp that includes an upper arm, and a lower arm connected to the upper arm at one edge of the upper arm. The upper and lower arms cooperating to define a recess configured to receive a pair of extruder barrel sections. The clamp further includes a locking structure configured to lock the upper arm to the lower arm with the pair of extruder barrel sections therebetween. The clamping system further comprises of a support structure for the clamp that includes a bracket connected to the clamp and a column connected to a base of the extruder. The bracket and column are connected to each other such that relative movement between the bracket and the column is permitted axially along the extruder barrels sections.

DETAILED DESCRIPTION

In the following description, for the purpose of explanation, specific details are set forth in order to provide a thorough understanding of the disclosed embodiments. However, it will be apparent that the disclosed embodiments may be practiced without these specific details.

It will be apparent to a person skilled in the art that the clamping system could be used to support and clamp the barrel sections of different types of extruders, including but not limited to Single-screw extruders and Multi-screw extruders. For the purpose of simplicity, the disclosed embodiments will be discussed with reference to twin-screw extruders.

Figure 1:
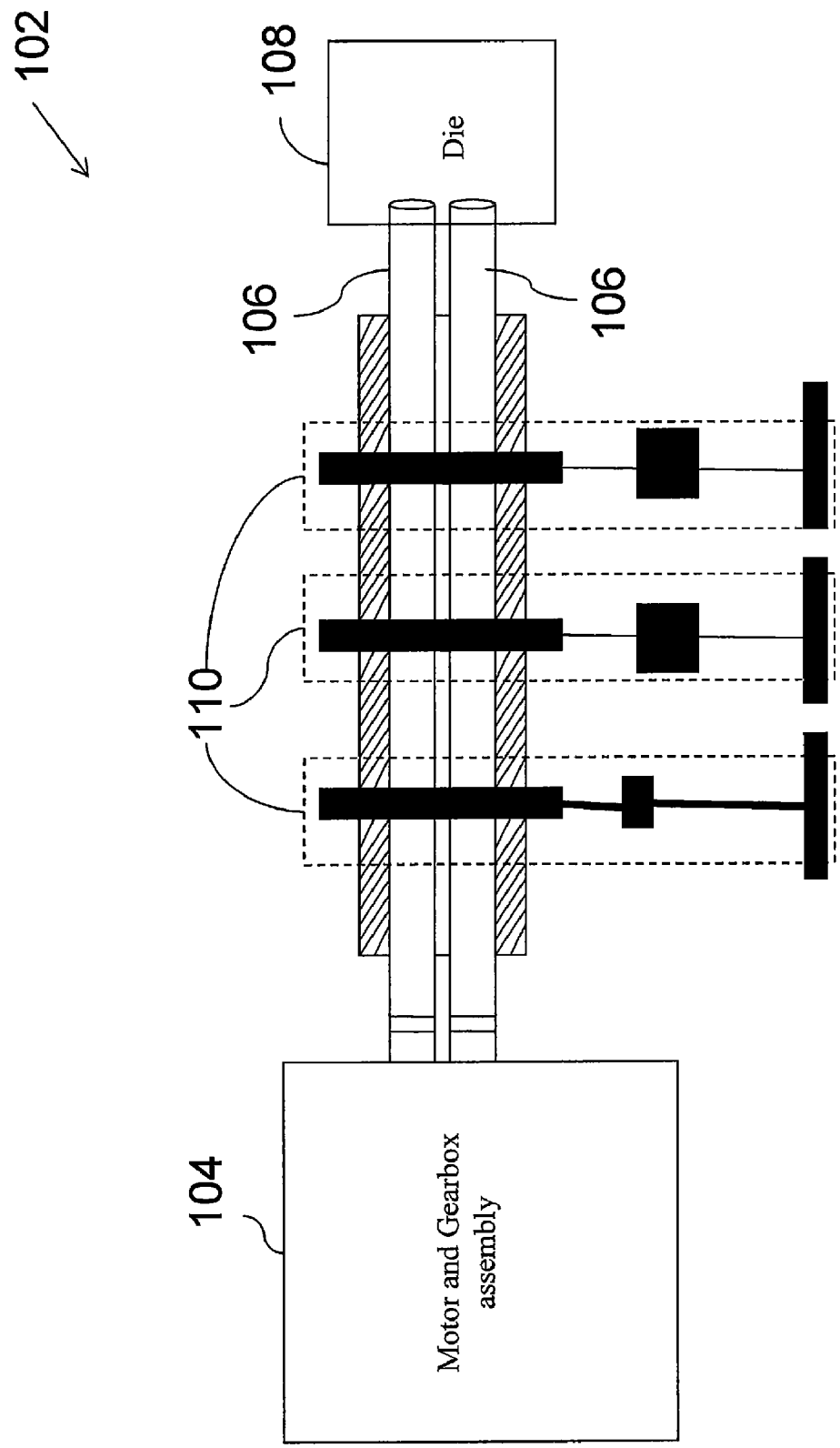
FIG. 1 is a schematic illustration of an environment in which a disclosed embodiment can be incorporated.

Referring to FIG. 1, a twin-screw extruder 102 as an environment in which the disclosed embodiments can be incorporated is illustrated. The extruder comprises a driving assembly 104 having a motor and a gearbox. Driving assembly 104 performs the task of transmitting power to pair of extruder screw shafts 106. The pair of extruder screw shafts 106 further comprises processing elements called extruder screw elements. The pair of extruder screw shafts 106 along with extruder screw elements rotates and processes the work material within the barrel assembly. The processed work material is further utilized in die 108 to obtain the desired product. Further, the barrel assembly is clamped and supported by barrel clamping system 110.

Figure 3:
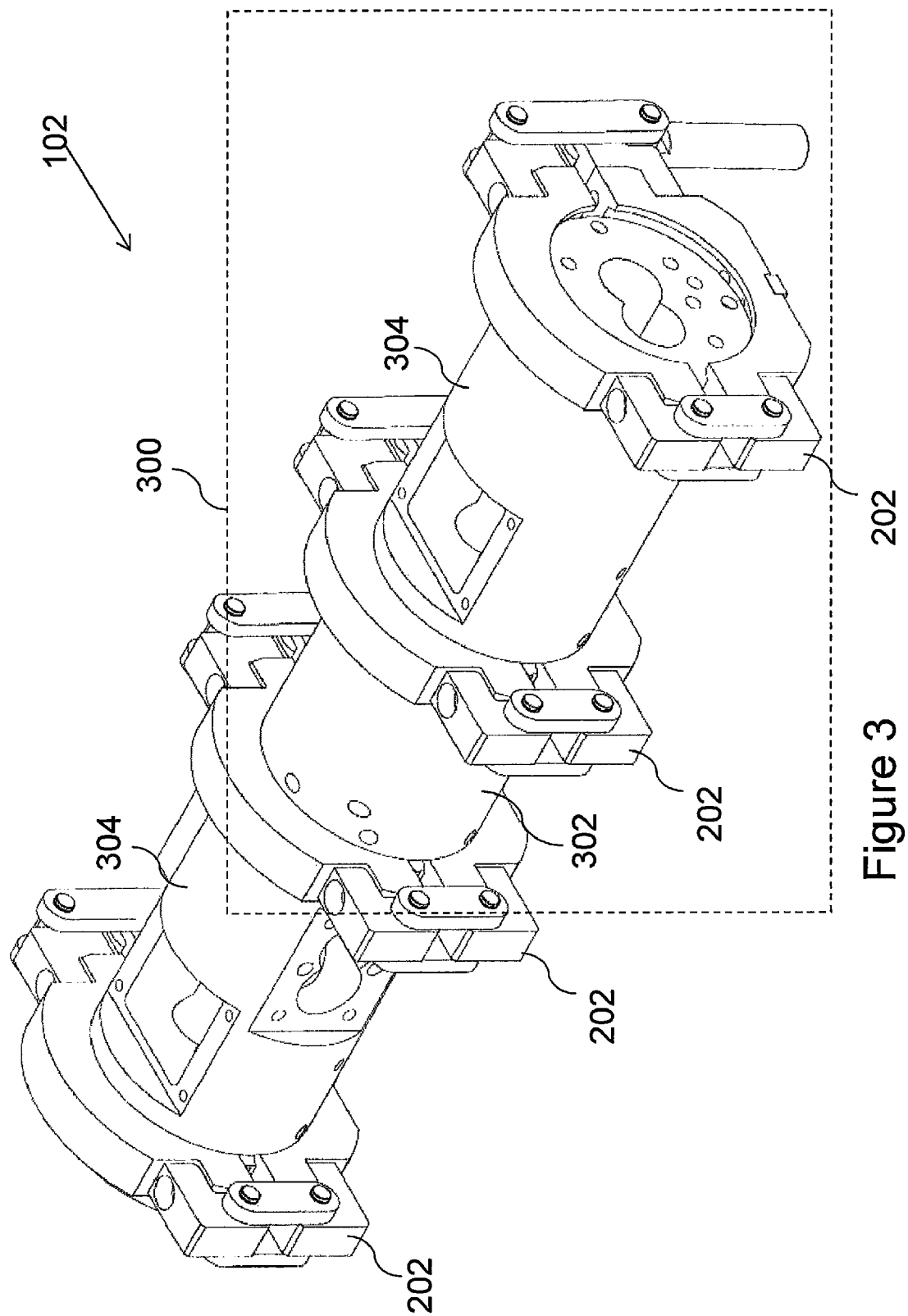
FIG. 3 is an isometric view of a twin-screw extruder barrel comprising of multiple barrels clamped by the clamping system.

Referring to FIG. 3 the extruder 102 comprises a plurality of adjoining barrel section units 300. Each barrel section unit 300 comprises a first barrel section 302 and a second barrel section 304. First barrel section 302 is clamped to adjoining second barrel section 304 with the help of clamp 202. One or more of such clamps may be supported by a support structure 208, 220. A barrel section is typically a block with circular, square or rectangle cross section with a longitudinal through bore. This is a stationary part of the extruder-processing zone. Inside the longitudinal bore of the barrel, a pair of intermeshing screw shaft assemblies rotates. A barrel liner is mounted within the bore. A barrel assembly is formed by clamping a set of barrel sections one after another with the longitudinal bore properly aligned.

Figure 4:
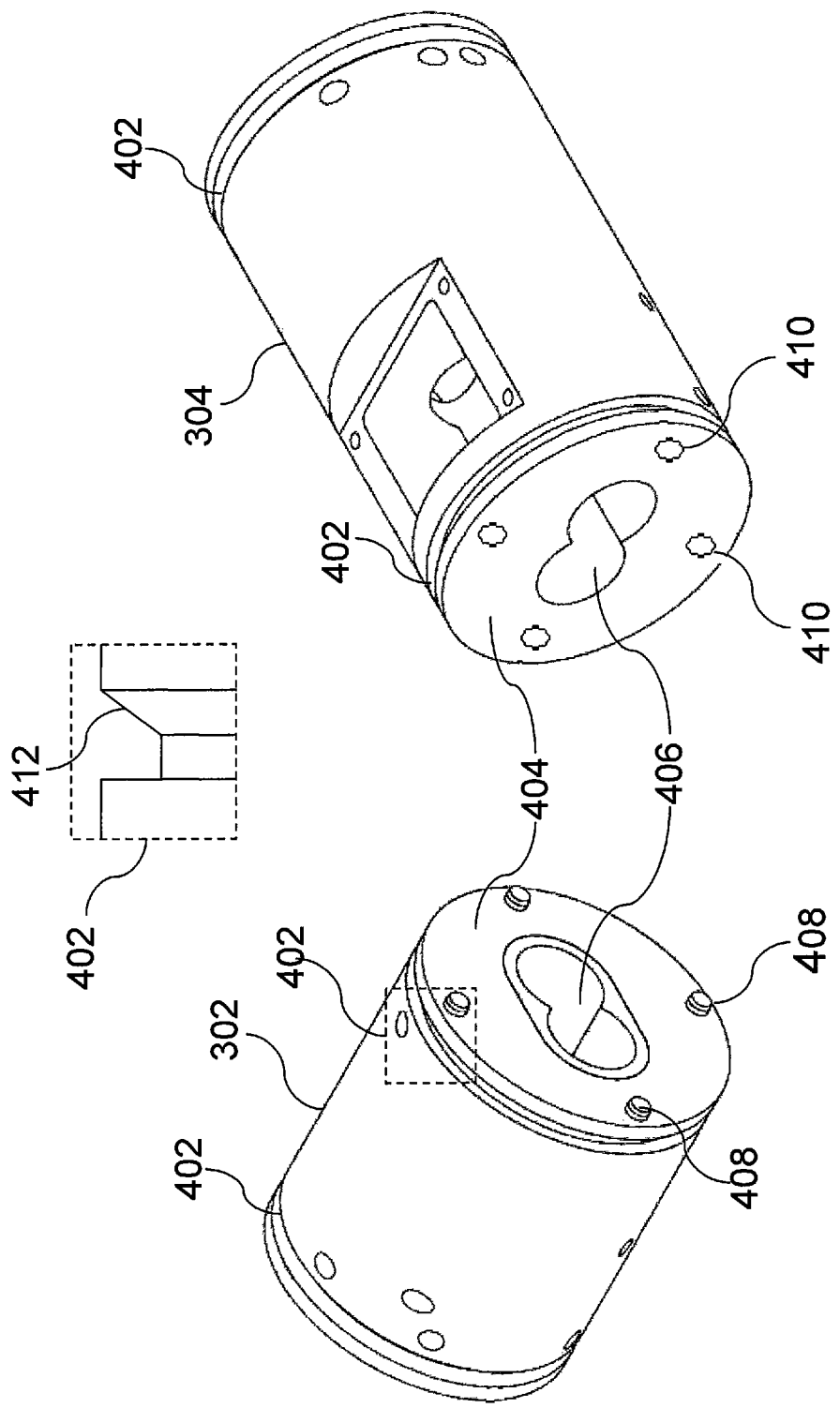
FIG. 4 is an isometric view of two adjacent barrel sections including the barrel alignment system, disassembled and shown at 90° to each other.

FIG. 4 is an isometric view of first barrel section 302 and second barrel section 304 of twin-screw extruder 102 disassembled and shown at 90° to each other. Both first barrel section 302 and second barrel section 304 may be provided with slot 402 machined along their circumference as an engagement structure. The barrel also defines an axial longitudinal bore 406. Further, self-locating features such as alignment pins 408 on first barrel section 302 and corresponding slots 410 on second barrel section 304 are provided. While assembling the plurality of adjoining barrel sections, end surfaces 404 of first barrel section 302 and second barrel section 304 are joined together such that the alignment pins 408 are engaged into corresponding slots 410, thus aligning longitudinal bore 406 of first barrel section 302 with longitudinal bore 406 of second barrel section 304. After securing precise alignment of longitudinal bore 406, clamp 202 is used at the junction formed between first barrel section 302 and second barrel section 304 to join and clamp rigidly both the barrel sections.

Figure 9:
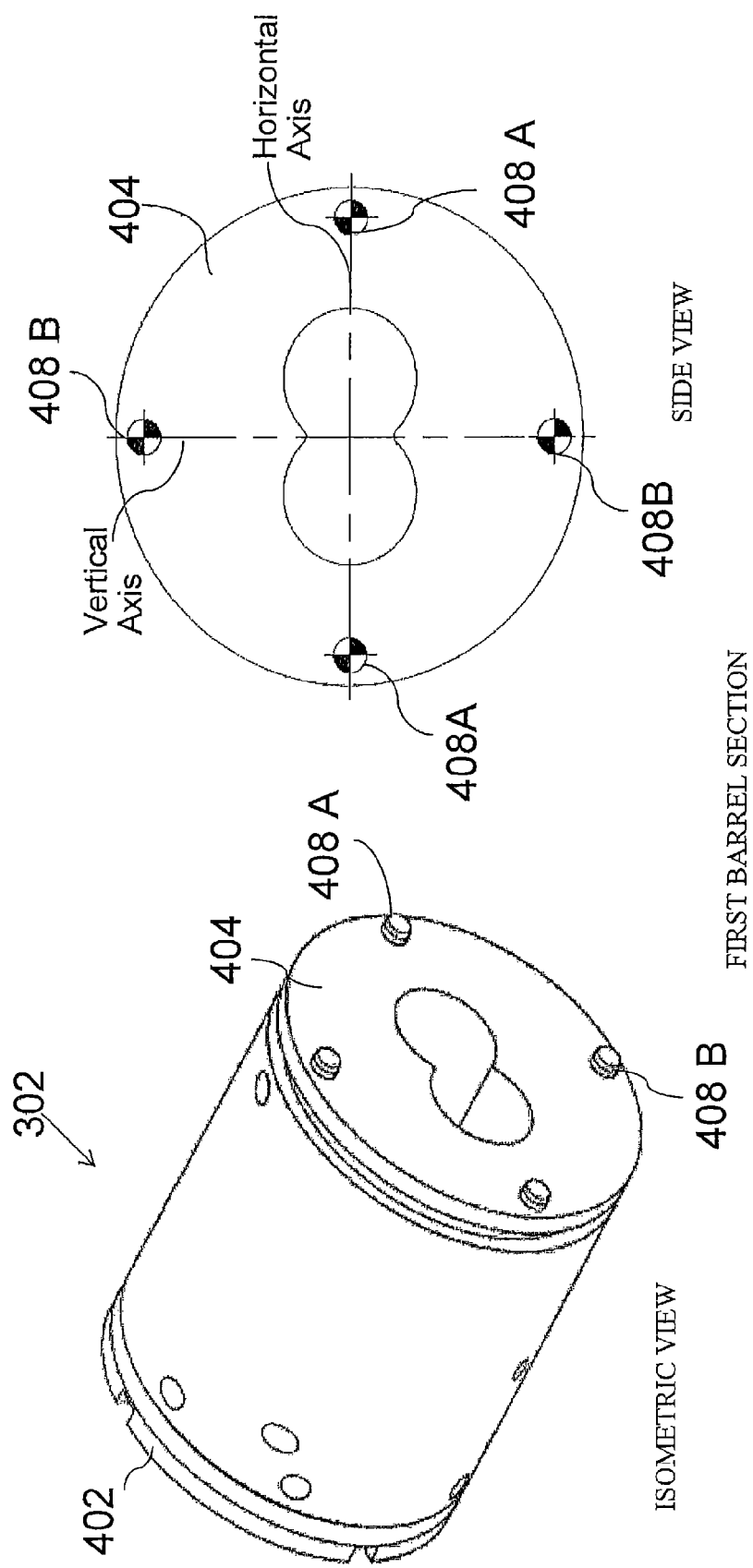
FIG. 9 is an isometric view and side view of a barrel section with alignment pins.
Figure 10:
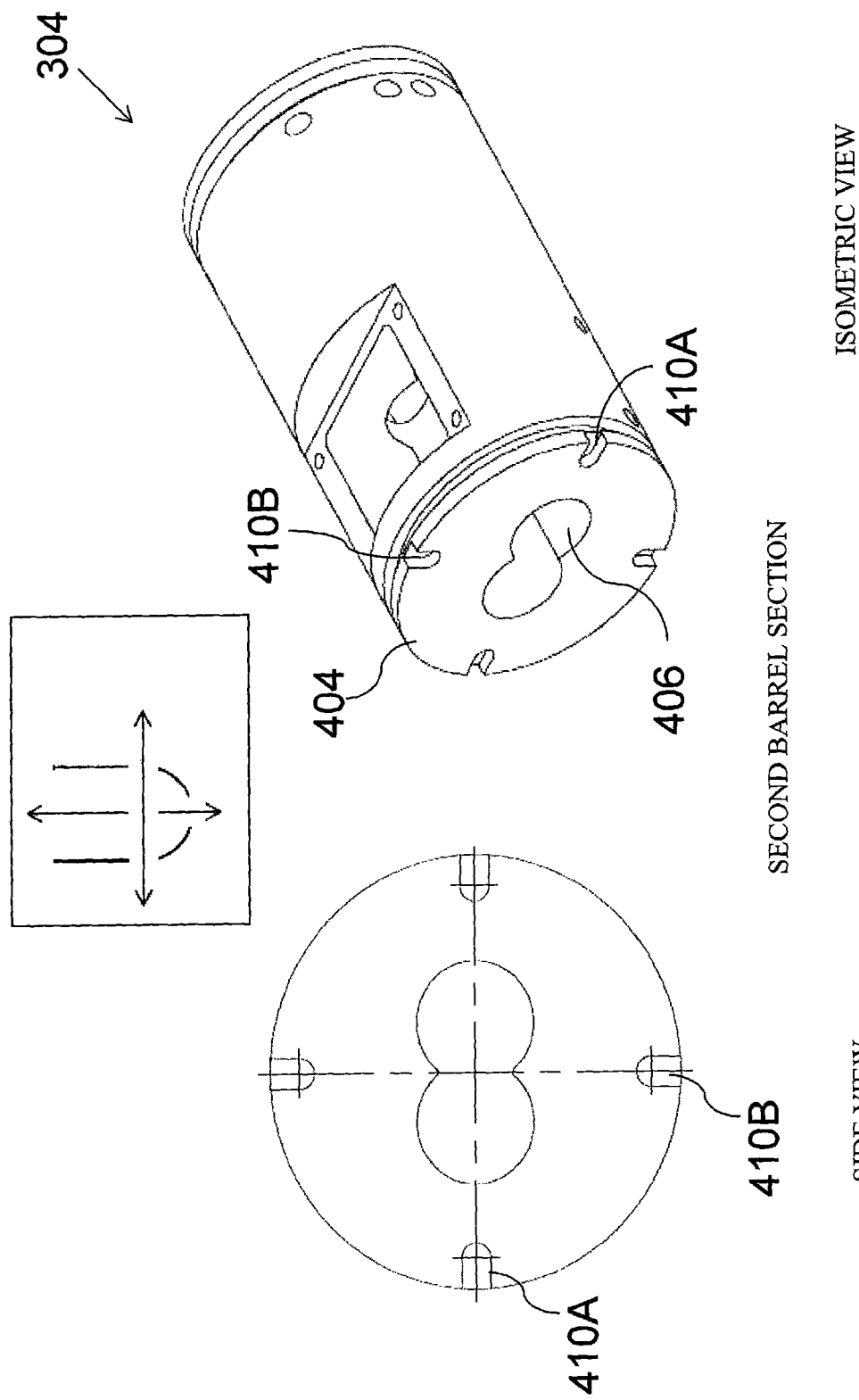
FIG. 10 is an isometric view and side view of a barrel section with slots machined on it.

Referring next to FIGS. 9 and 10, a pair of horizontal alignment pins 408A along the horizontal axis of the barrel section 302 and a pair of vertical alignment pins 408B along the vertical axis of the barrel section 302, collectively alignment pins 408A, 408B, are fixed on the end surface 404. The plurality of alignment pins can be fixed on the end surface 404 by means of screwing in the threads on the end surface 404, welding on the end surface 404 or any other joining means known in the art. The alignment pins shown in FIG. 9 are cylindrical. However, alignment pins 408A, 408B with tapering end, rectangular shape or any other cross section can be used in other embodiments.

FIG. 10 illustrates the second barrel section 304 defining an end surface 404. End surface 404 is configured to abut the end surface 404 of first barrel section 302. Bore of first barrel section 302 has its axis perfectly aligned with that of bore of second barrel section 304. A pair of horizontal slots 410A and pair of vertical slots 410B (collectively slots) is machined on the end surface 404. The plurality of slots 410A, 410B is machined by methods like milling, grinding and other machining means available in the art. The slot 410A, 410B is dimensioned proportional to the alignment pin to be received by it. The dimensions of the slots 410A, 410B are configured to accommodate relative thermal expansion between the pair of barrel sections. The width of the slot 410A, 410B is substantially equal to that of the alignment pin 408A, 408B to be received by it to prevent any relative movement between the barrel sections 302, 304 in one direction. The length of the slot 410A, 410B is larger than the width of the alignment pin 408A, 408B to permit relative thermal expansion between the barrel sections in one direction.

Figure 11:
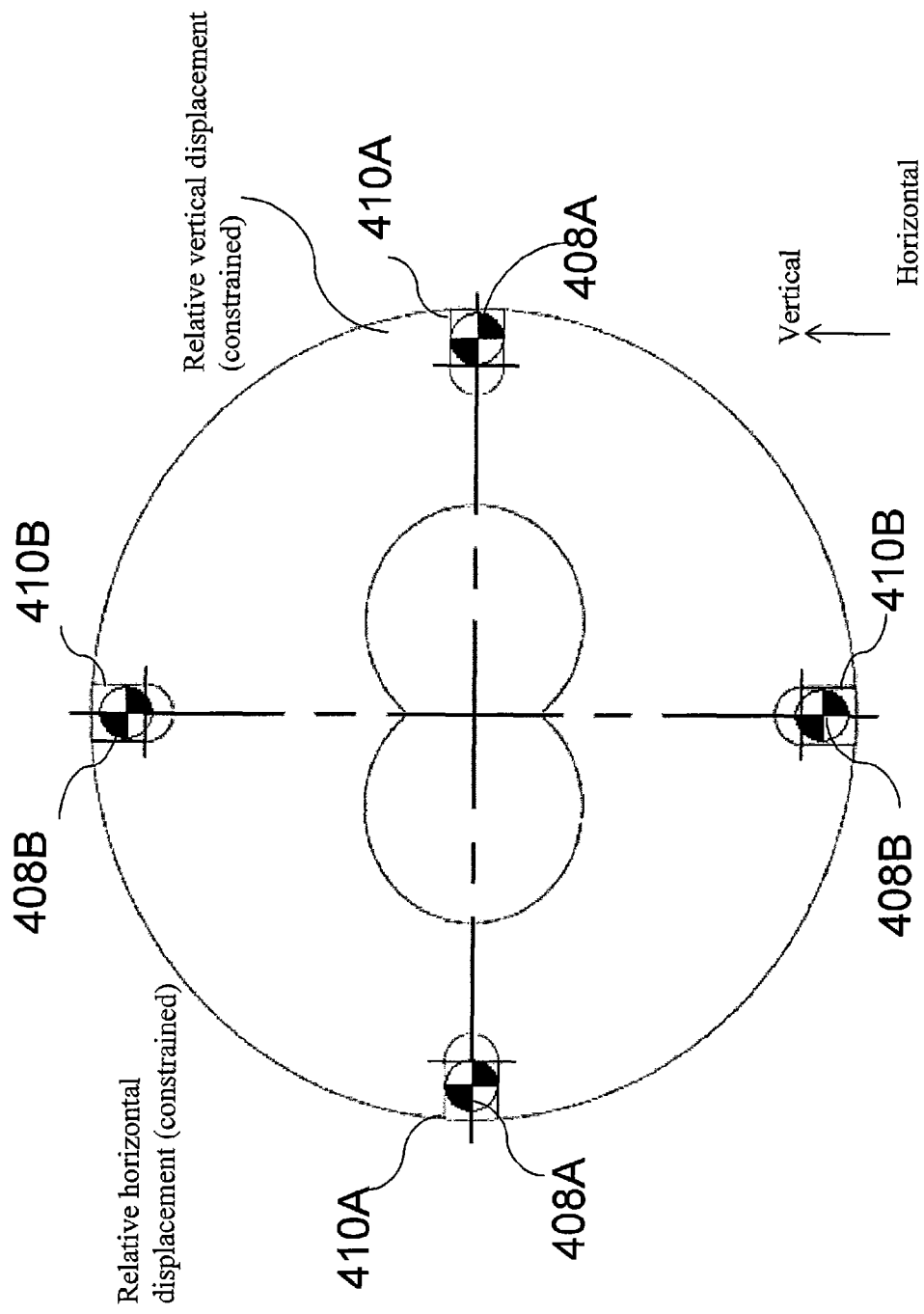
FIG. 11 depicts the utility of the disclosed embodiments in preventing the relative displacement of the barrel sections.

Referring to FIG. 11, the horizontal alignment pins 408A are capable of movement along the slot length. However, movement of the horizontal alignment pins 408A along the breadth of corresponding slot 410A is constrained. Similarly, the vertical slots 410B allow thermal expansion of pair of vertical alignment pins 408B along its length. However, movement of each of pair of vertical alignment pins 408B along the breadth of corresponding vertical slot 410B is constrained.

Figure 2A:
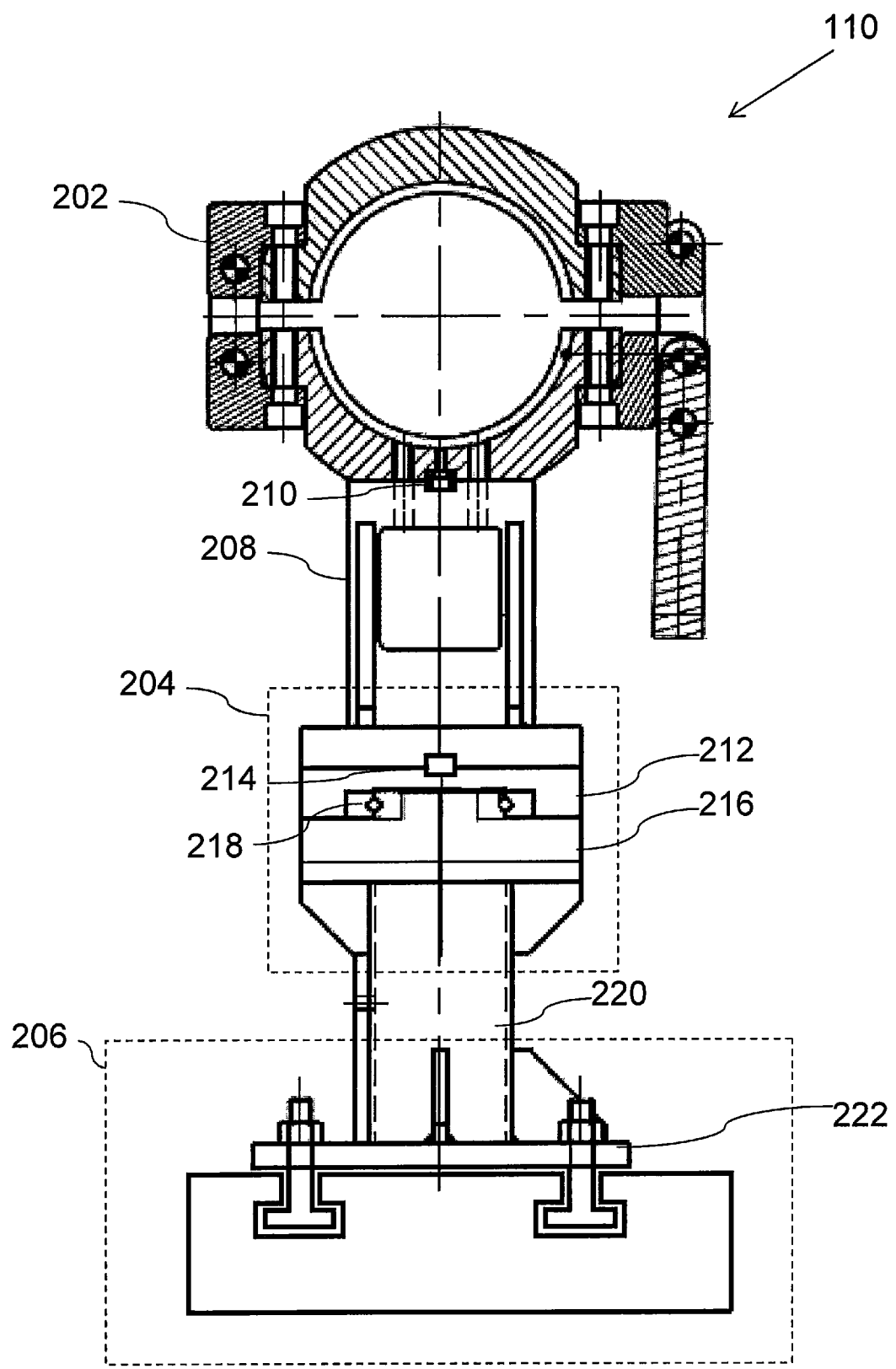
FIG. 2A illustrates the side view of the clamping system, according to a disclosed embodiment.
Figure 2B:
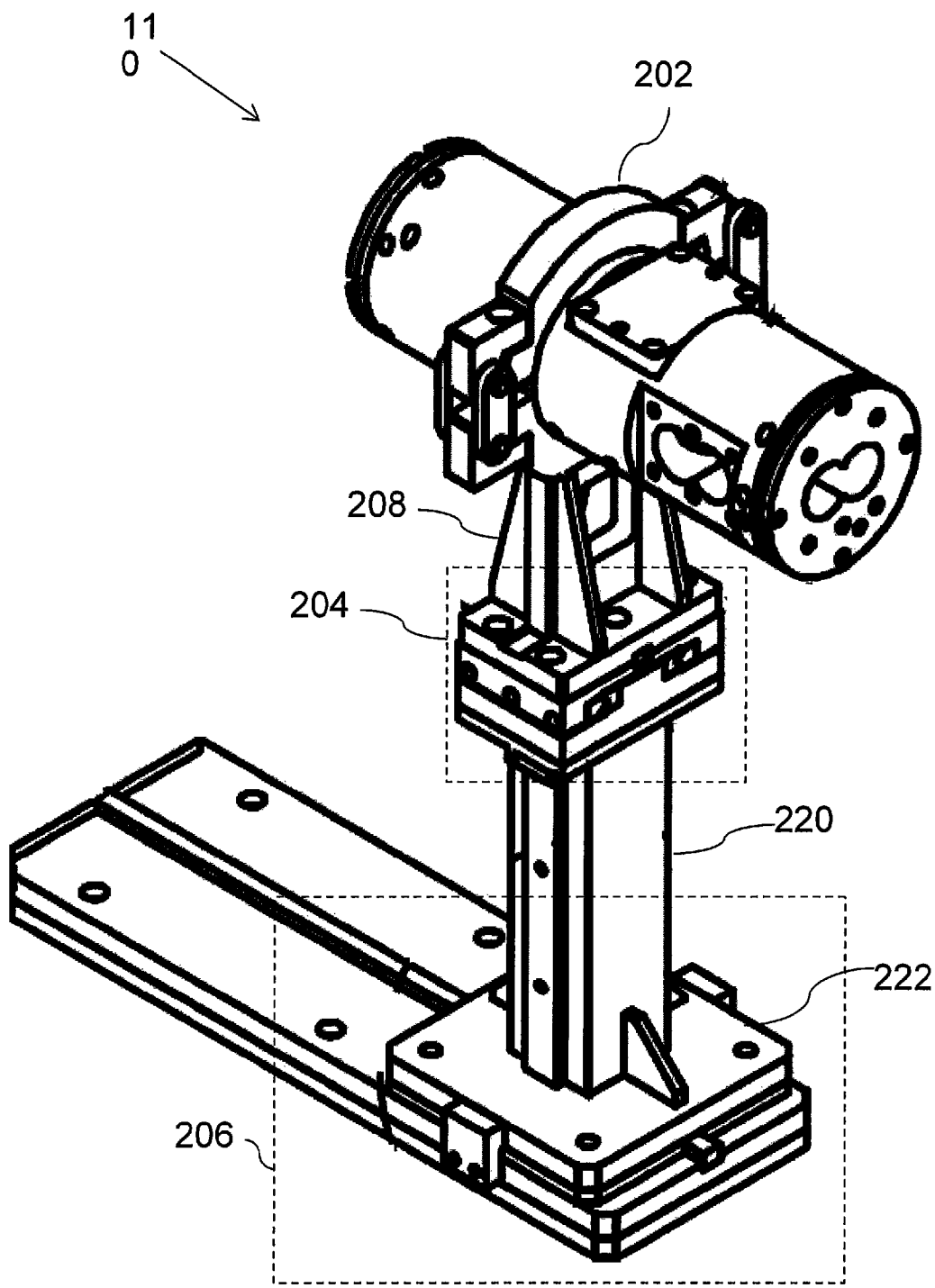
FIG. 2B is an isometric view of the clamping system clamping a pair of barrel sections.

Referring next to FIG. 2A and FIG. 2B, the clamping system 110 includes a clamp 202 and a support structure 208, 220. Clamp 202 is mounted on a bracket 208 by any suitable means such as with the help of a key 210. The bracket 208 is connected to a support column 220 such that relative movement between them is permitted in the axial direction. The bracket 208 and the column 220 may for example be mounted in slidably engagement. The column is mounted on the base of the extruder 222. In the embodiment illustrated, the support structure is mounted on a guide rail system 206 that is provided on the extruder base 222.

Figure 7:
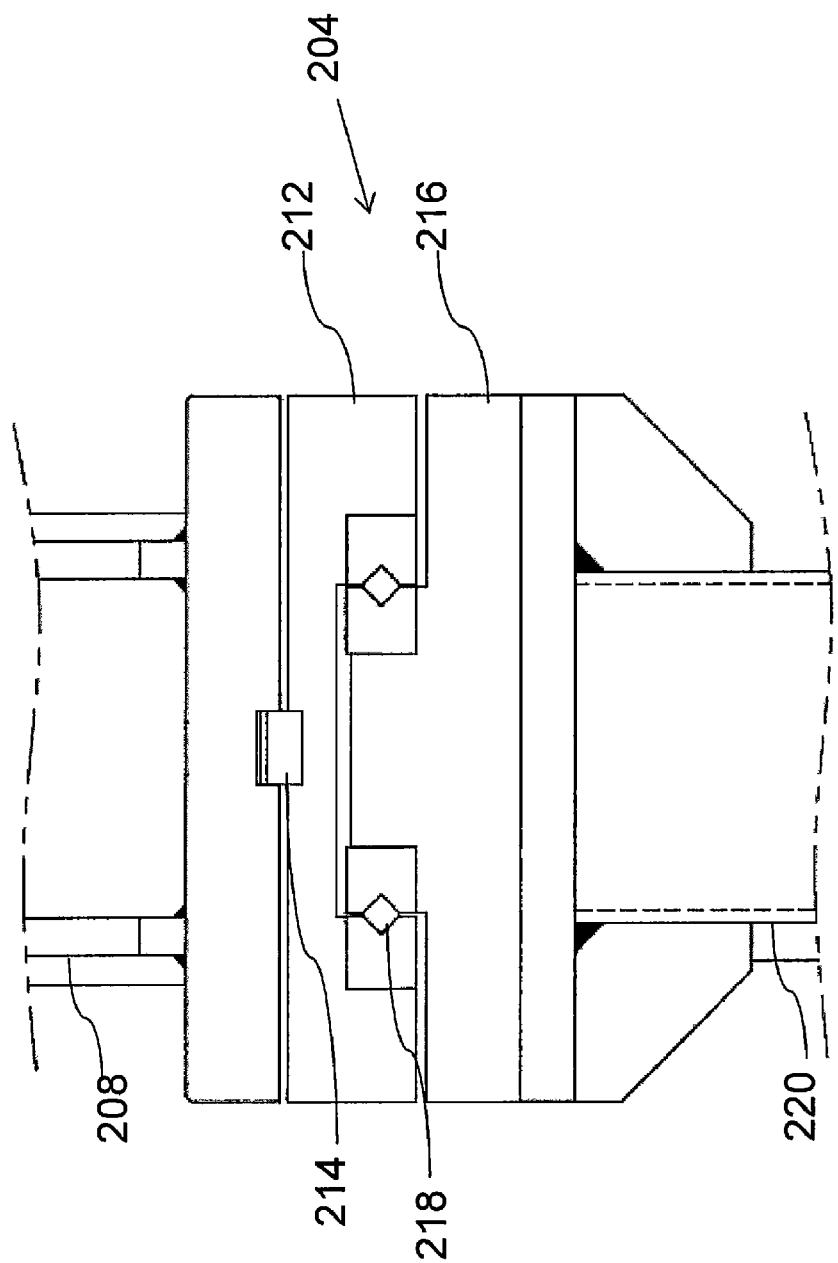
FIG. 7 is the side view of the barrel support structure according to one embodiment.

Referring next to FIG. 7, the relative axial movement between the bracket and the column may be achieved by mounting a linear bearing 204 between them. The bracket 208 is mounted on the outer race 212 of linear bearing 204 with the help of a key 214. Outer race 212 can slide on inner race 216 of the linear bearing 204 with the help of rotating elements 218. Inner race 216 is attached to column 220 that is fixed on base plate 222. This sliding between the outer and inner race provides a linear movement to clamp 202 relative to the extruder base 222.

In accordance with an embodiment, the support structure 208, 220 may be of adjustable height to accommodate different barrel sections and to further ease assembly of barrel. The length of the support structure can be varied as per specific requirements of the extruder.

Figure 8:
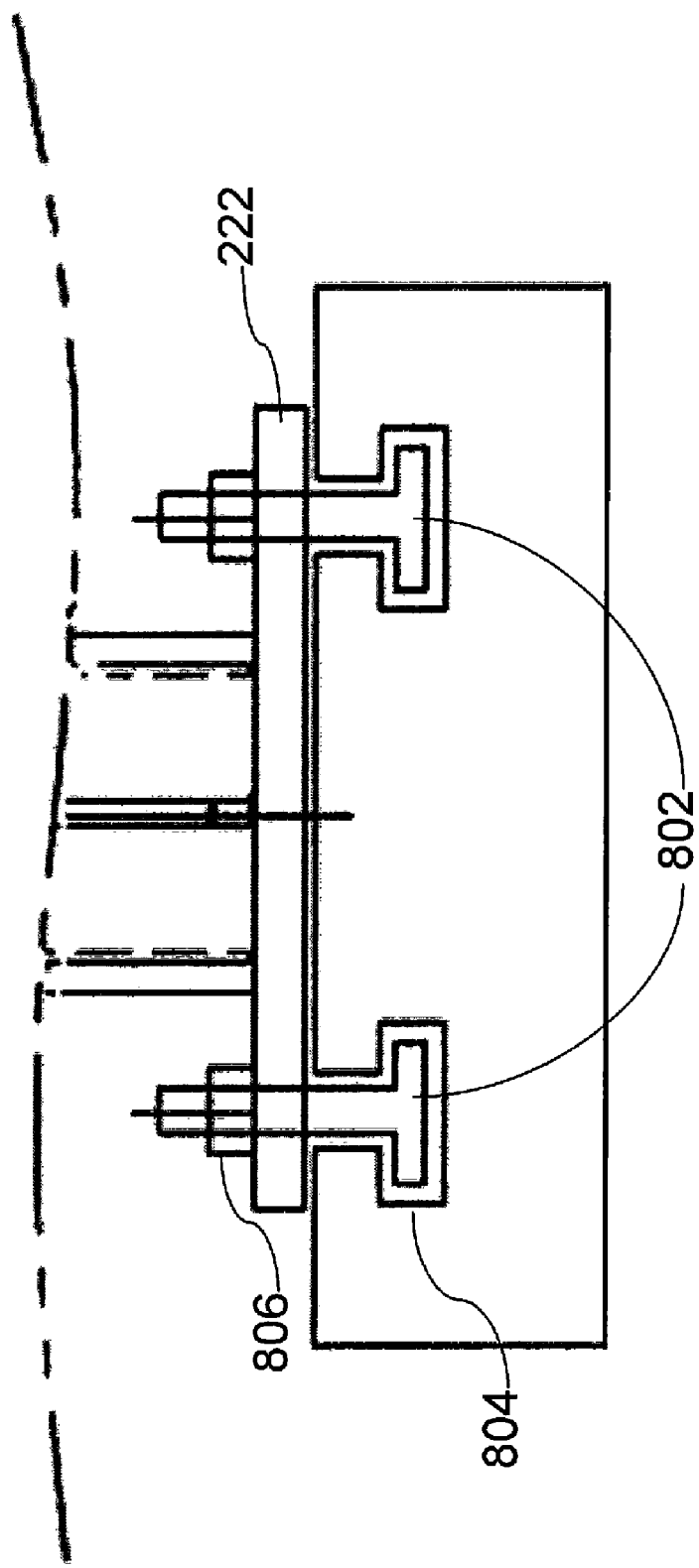
FIG. 8 is the side view of the guide rail for the support structure according to a disclosed embodiment.

Referring next to FIG. 8, the support structure may be mounted on a guide rail system. According to an embodiment, tee-nuts 802 and corresponding longitudinal tee-slots 804 are provided which form parts of guide rail system 206. Tee-nuts 802 pass through corresponding holes in the base plate 222 and can slide in the longitudinal tee-slots 804. The tee-nuts 802 may be secured on to the base plate with the help of fasteners such as nuts 806 and the like. The number of tee-nuts 802 and the corresponding tee-slots 804 and nuts 806 used may vary as per the requirements. A spacer (not shown) may be positioned between the base plate 222 and the tee-slots 804.

Figure 5A:
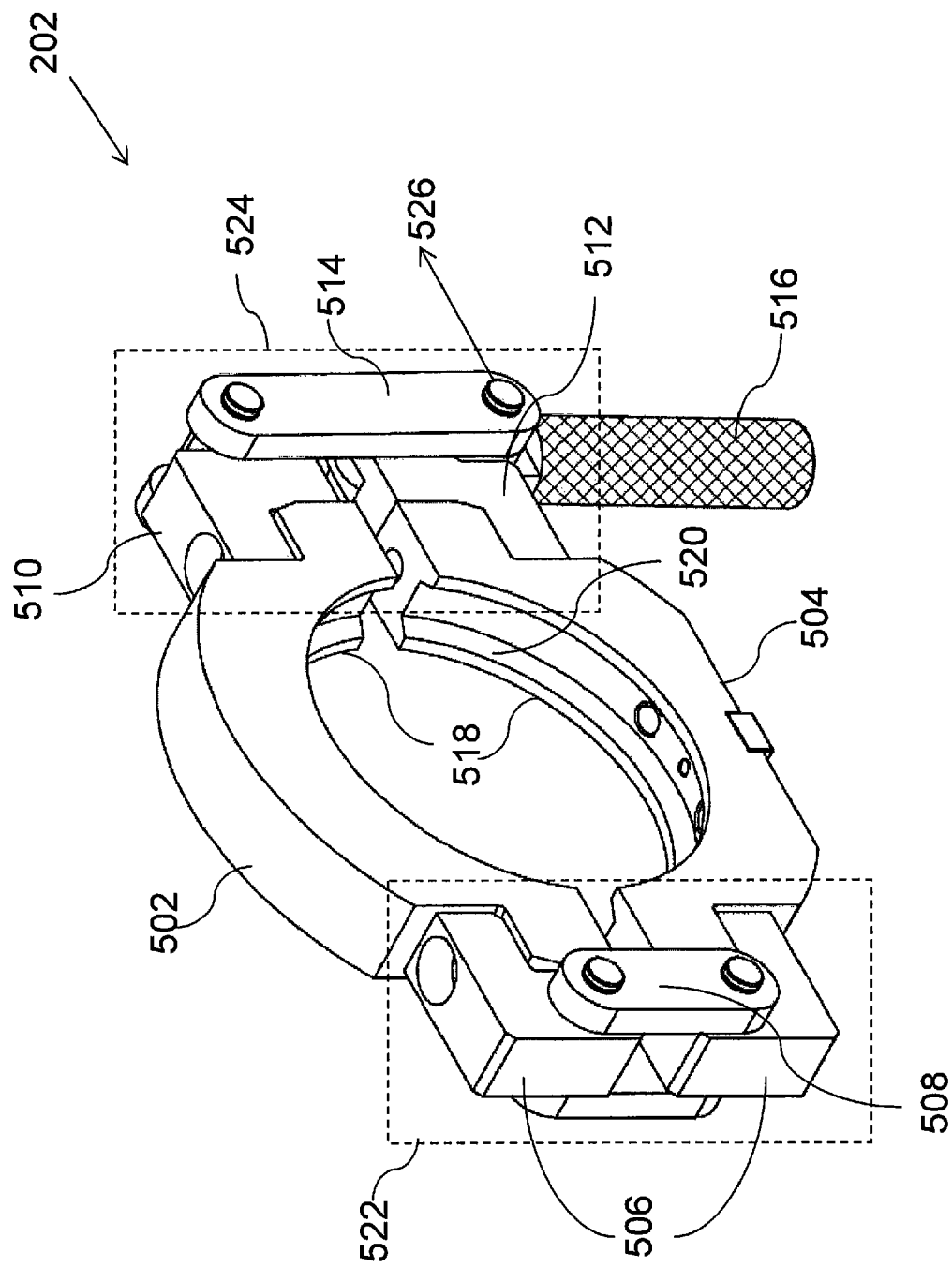
FIG. 5A is an isometric view of a disclosed clamp.

Referring next to FIG. 5A, clamp 202 comprises upper arm 502 and lower arm 504 with the lower arm connected to the upper arm at one edge of the upper arm. The upper and lower arms are connected by a hinge or in a manner that permits pivotal movement between the arms. The upper and lower arms are configured to collectively define a recess in which a pair of extruder barrel sections may be received for clamping. In the embodiment illustrated, upper arm 502 and lower arm 504 are hinged at first end 522 by a pair of brackets 506 and hinge links 508. On the second edge 524 of clamp 202 a locking structure is provided to lock the upper arm to the lower arm. In the embodiment illustrated, a set of brackets, a hook bracket 510 and pivot bracket 512 are provided. Hook bracket 510 and pivot bracket 512 are connected by clamp link 514, pivot pin 526 and toggle lever 516.

The upper arm 502 and lower arm 504 of the clamp 202 are sized proportionate to the barrel section to be clamped by them. The upper and lower arms are also shaped relative to the barrel sections to be clamped by them. In the embodiment illustrated, the arms are semi-circular in shape that co-operates to define a circular recess configured to receive a pair of circular barrel sections for clamping.

The brackets 506 at first edge 522 are L-shaped parts. Brackets 506 are mounted on the upper arm 502 and lower arm 504 of clamp 202 with fasteners. Brackets 506 are connected to each other by hinge links 508 on either side in such a way that both arms become an integral unit and at the same time can easily swing about hinge links 508.

Figure 6:
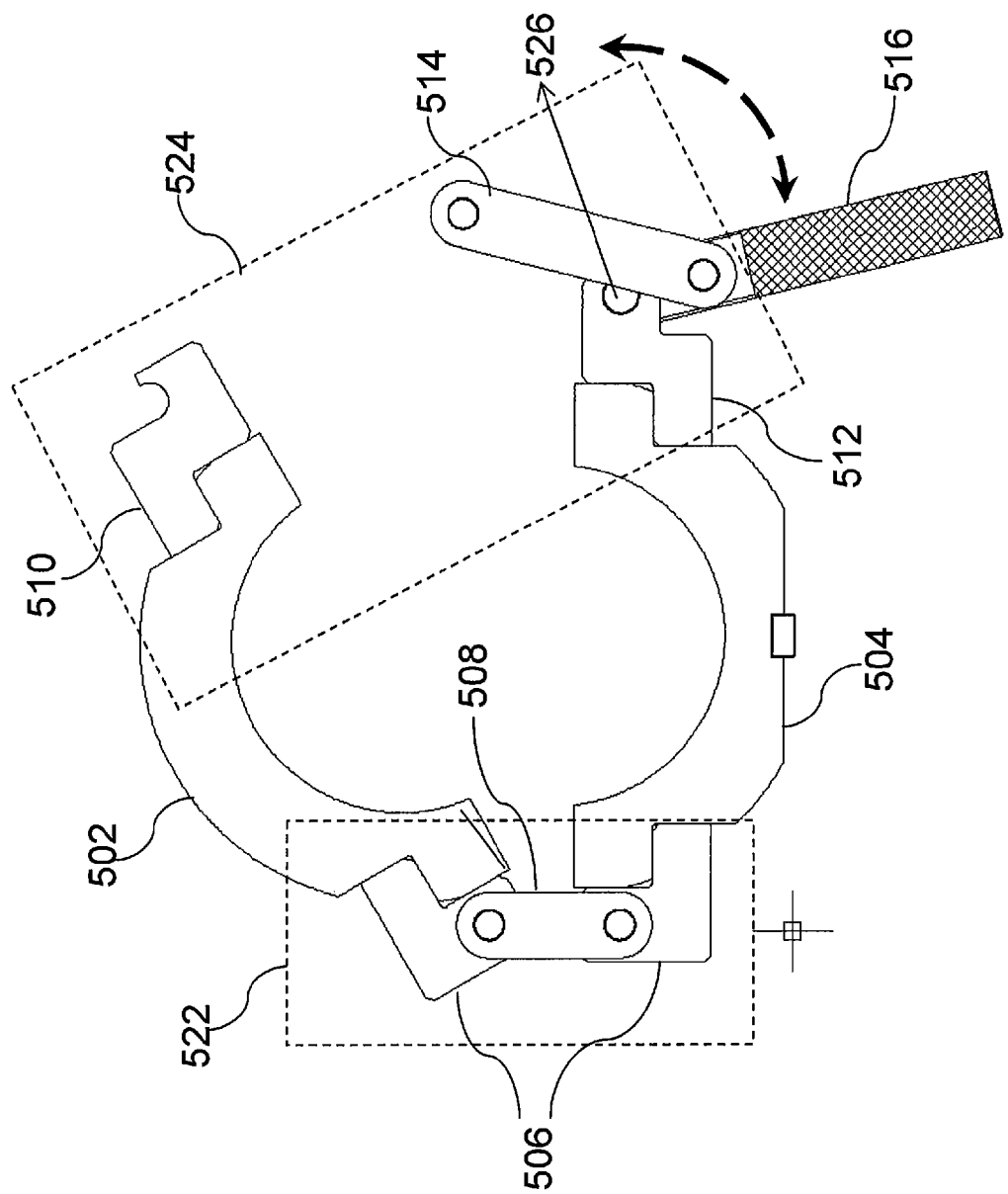
FIG. 6 is a side view of the clamp using a toggle lever in an open position.

The hook bracket 510 is fastened to the upper arm 502 at the second edge 524. The pivot bracket 512 is fastened to the lower arm with fasteners. The pivot bracket 512 is also connected to the clamp link 514 and toggle lever 516 with pivot pin 526. The clamp link 514 can pivot about pivot pin 526. Clamp link 514 is configured to engage the hook bracket 510 such that upper arm 502 and lower arm 504 are held together in a clamped state. The movement of the toggle lever 516 down results in the engagement of clamp link 514 with the hook bracket 510 and the movement of the toggle lever 516 upwards results in the disengagement of the clamp link 514 with the hook bracket 510. The toggle lever 516 works as the locking structure and is deployed for clamping and unclamping the barrel sections. The movement of toggle lever 516 is shown in FIG. 6 in the open position with upper arm 502 and lower arm 504 pivoting about hinge links 508.

Figure 5B:
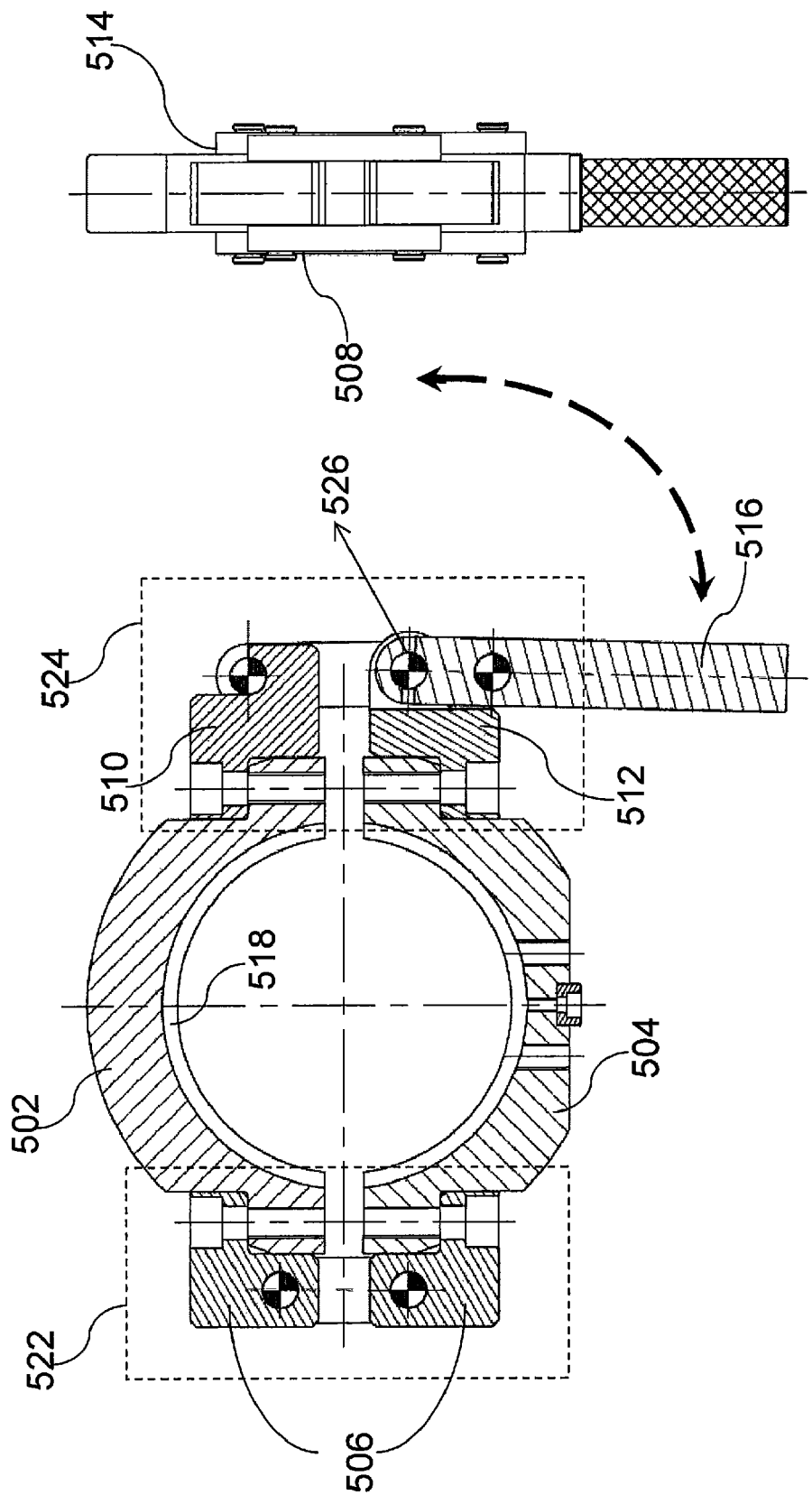
FIG. 5B is the sectional side and end view of the clamp.

Referring next to FIGS. 4 and 5B, the engagement structure of the clamp to retentively couple a barrel section or a barrel liner is disclosed. The upper arm 502 and lower arm 504 each comprise a projection 518 projecting radially inwards. The projection is preferably tapered or at an inclination to the barrel section. The tapered flange 518 is configured to engage a corresponding slot 402 of first barrel section 302 and second barrel section 304. The taper angle of the tapered flange 518 is complementary to the taper angle of slot 402 of barrel section 300. It will be apparent to a person skilled in the art that shape of slot 402 and the corresponding shape of the tapered flange 518 as illustrated in the description are not a limitation of the disclosed embodiments. Any shape depending on the cross section of barrel section unit 300, the clamping requirements may be chosen.

Industrial Applicability

A system for clamping together a pair of extruder barrel sections of an extruder comprising a clamp including an upper arm, and a lower arm connected to the upper arm at one edge of the upper arm, the upper and lower arms cooperating to define a recess configured to receive a pair of extruder barrel sections, and a locking structure configured to lock the upper arm to the lower arm with the pair of extruder barrel sections therebetween, a support structure for the clamp comprising a bracket connected to the clamp and a column connected to a base of the extruder, the bracket and column connected to each other such that relative movement between the bracket and the column is permitted axially along the extruder barrels sections.

Such system(s), further comprising a linear bearing connecting the bracket to the column, the linear bearing configured to permit relative axial movement therebetween.

Such system(s), wherein the column is connected to a guide rail permitting relative axial movement between the column and the extruder base.

Such system(s), wherein the clamp includes an engagement structure configured to retentively couple an extruder barrel section.

Such system(s), wherein the clamp includes an engagement structure configured to retentively couple a barrel liner positioned within the extruder barrel section.

Such system(s), wherein the engagement structure is a projection configured to engage a corresponding slot on the extruder barrel section.

Such system(s), wherein the projection is inclined relative the extruder barrel section.

Such system(s), wherein the bracket and the column are configured to accommodate axial thermal expansion in the extruder barrel sections.

Such system(s), wherein each of the pair of barrel sections defines an end surface configured to abut each other, and wherein a plurality of alignment pins is distributed on the end surface of the first barrel section; and a corresponding number of slots is defined on the end surface of the second barrel section, each slot configured to receive one alignment pin, wherein the slot has a width substantially equal to that of the alignment pin and a length larger than the width of the alignment pin permitting relative radial thermal expansion between the pair of barrel sections.

Such system(s), wherein the column is configured to be of adjustable height to accommodate different barrels section dimensions.

Such system(s), wherein the locking structure is a toggle lever.

An extruder comprising a plurality of barrel sections abutting each other to form the extruder barrel, a clamping system for clamping together a pair of adjacent extruder barrel sections, the clamping system comprising a clamp including an upper arm, and a lower arm connected to the upper arm at one edge of the upper arm, the upper and lower arms cooperating to define a recess configured to receive a pair of extruder barrel sections, and a locking structure configured to lock the upper arm to the lower arm with the pair of extruder barrel sections therebetween, a support structure for the clamp comprising a bracket connected to the clamp and a column connected to a base of the extruder, the bracket and column connected to each other such that relative movement between the bracket and the column is permitted axially along the extruder barrels sections.

The clamping system disclosed is suitable for quick and easy clamping of two adjoining barrel sections. The clamping system can be used to clamp the barrel section casing or the barrel liner. The barrel sections may be a part of a twin-screw extruder. The twin-screw extruder may comprise a number of abutting barrel sections clamped to each other resulting in a long barrel. Each barrel section has a longitudinal bore. A pair of extruder screw shafts is housed inside the resulting longitudinal bore after the barrel sections are abutted linearly. In an extruder, different barrel sections are required to carry out different processes such as conveying, kneading, mixing, devolatalizing, metering and the like. The material being extruded may have to undergo these processes in a particular sequence, wherein the sequence is governed by the characteristics of the material or of the required product. The clamping system permits quick and easy assembly of the barrel sections in the desired sequence.

The sliding support structure permits the clamp to be easily positioned on the barrel sections and permits adjustment of the barrel sections before clamping. Moreover, the guide rail system further eases assembly by positioning clamps in a non-obstructive manner when barrel sections are being assembled or disassembled. As the support requirements of clamp 202 may change with a change in the loading conditions of barrel sections, support structure can be appropriately shifted to provide adequate support.

Toggle lever 516 is beneficial for use in a situation where frequent change of sequence of the plurality of adjoining barrel section unit 300 is required. Toggle lever 516 enables quick assembling and dismantling of clamp 202. Adequate clamping force is achieved through the toggle mechanism, with minimum effort on toggle lever 516.

The clamp 202 may be assembled or dismantled in just three steps. For assembling, the upper arm 502 and lower arm 504 are wrapped around the junctions of the plurality of adjoining barrel section unit 300 to be clamped. Then, the clamp link 514 is placed on hook bracket 510. Finally, toggle lever 516 is pushed down to tighten clamp 202. For dismantling of clamp 202 in order to de-clamp the barrel section units 300, these three steps are carried out in the reverse order.

There is substantial increase of pressure and temperature inside the barrel sections during processing of the material. This leads to linear expansion of the barrel sections. The clamping force between the two adjoining barrel sections may be configured to proportionately increase when the tapered flange 518 is in slot 402, during the clamped condition, thereby preventing leakage of the material between the barrel sections at any elevated pressures and temperatures.

According to some embodiments, the clamp 202 may exist as a single piece with all parts pivotally inter-connected to each other. Different parts of jiffy clamp 202 are not separated from each other and jiffy clamp 202 is only opened or closed as one-piece. Therefore, there is no risk of losing parts of jiffy clamp 202 during operation.

The clamping system also ensures a continuous long processing zone with leak proof sealing between any two barrel sections irrespective of thermal expansion or contraction of the barrel sections. Since the various barrel sections of the extruder operate at various temperatures, this heating of the barrel sections may lead to their thermal expansion in the longitudinal direction. Clamps 202 clamping the barrel sections and support structure permit axial movement of the barrel sections. Therefore, any change in the length of the barrel section causes the bracket to move relative to the column, or where a linear bearing is employed, will make outer race 212 slide relative to inner race 216. The sliding is such that clamping system 110 remains upright without disturbing alignment. In accordance with an aspect, the support structure may allow a movement of 30 mm along the length of the extruder.

The clamping system accommodates for the axial thermal expansion of the barrels. In addition the clamp engagement structure permits relative thermal expansion between barrel sections as provided by the alignment pins.

The invention claimed is:

1. A system for clamping together a pair of extruder barrel sections of an extruder comprising:
a clamp including an upper arm, and a lower arm connected to the upper arm at one edge of the upper arm, the upper and lower arms cooperating to define a recess configured to receive a pair of extruder barrel sections, and a locking structure configured to lock the upper arm to the lower arm with the pair of extruder barrel sections therebetween;
a support structure for the clamp comprising a bracket connected to the clamp and a column connected to a base of the extruder, the bracket and column connected to each other such that relative movement between the bracket and the column is permitted axially along the extruder barrel sections.

2. A system as claimed in claim 1 further comprising a linear bearing connecting the bracket to the column, the linear bearing configured to permit relative axial movement therebetween.

3. A system as claimed in claim 1 wherein the column is connected to a guide rail permitting relative axial movement between the column and the extruder base.

4. A system as claimed in claim 1 wherein the clamp includes an engagement structure configured to retentively couple an extruder barrel section.

5. A system as claimed in claim 4 wherein the clamp includes an engagement structure configured to retentively couple a barrel liner positioned within the extruder barrel section.

6. A system as claimed in claim 4 wherein the engagement structure is a projection configured to engage a corresponding slot on the extruder barrel section.

7. A system as claimed in claim 6 wherein the projection is inclined relative the extruder barrel section.

8. A system as claimed in claim 1 wherein the bracket and the column are configured to accommodate axial thermal expansion in the extruder barrel sections.

9. A system as claimed in claim 1 wherein each of the pair of barrel sections defines an end surface configured to abut each other, and wherein a plurality of alignment pins is distributed on the end surface of a first of the pair of barrel sections; and a corresponding number of slots is defined on the end surface of a second of the pair of barrel sections, each slot configured to receive one alignment pin, wherein the slot has a width substantially equal to that of the alignment pin and a length larger than the width of the alignment pin permitting relative radial thermal expansion between the pair of barrel sections.

10. A system as claimed in claim 1 wherein the column is configured to be of adjustable height to accommodate different barrels section dimensions.

11. A system as claimed in claim 1 wherein the locking structure is a toggle lever.

12. An extruder comprising:
a plurality of barrel sections abutting each other to form an extruder barrel;
a clamping system for clamping together a pair of adjacent extruder barrel sections,
the clamping system comprising
a clamp including an upper arm, and a lower arm connected to the upper arm at one edge of the upper arm, the upper and lower arms cooperating to define a recess configured to receive the pair of extruder barrel sections, and a locking structure configured to lock the upper arm to the lower arm with the pair of extruder barrel sections therebetween;
a support structure for the clamp comprising a bracket connected to the clamp and a column connected to a base of the extruder, the bracket and column connected to each other such that relative movement between the bracket and the column is permitted axially along the extruder barrel sections.

* * * * *